Patented July 31, 1951

2,562,432

UNITED STATES PATENT OFFICE 2,562,432

PREPARATION OF SULFURYL CHLOROFLUORIDE

Harold Gilman McCann, Deer Park, and Horace Quay Trout, Brooklyn, N. Y., assignors to Allied Chemical & Dye Corporation, New York, N. Y., a corporation of New York No Drawing. Application August 31, 1948, Serial No. 47,146

8 Claims. (Cl. 23—14)

This invention relates to the preparation of sulfuryl chlorofluoride, a material suitable for use, e. g. as an intermediate, in other chemical operations.

It has been proposed to make sulfuryl chlorofluoride ($SO_2ClF$) by reacting sulfuryl chloride ($SO_2Cl_2$) with antimony trifluoride ($SbF_3$) fluorinating agent. The disadvantages of this process are the necessity of providing an additional catalytic material, e. g. antimony pentachloride ($SbCl_5$) to promote the reaction between the $SO_2Cl_2$ and the $SbF_3$, the requirement of employing superatmospheric pressures, such as pressure approximately 100 p. s. i. g., and the fact that the fluorinating agent, once consumed, cannot be reused, i. e., antimony trichloride ($SbCl_3$) to which the $SbF_3$ is converted by reaction with the $SO_2Cl_2$ cannot readily be reconverted to antimony trifluoride for reuse in the process.

It is an object of this invention to provide for the manufacture of good yields of $SO_2ClF$ by procedures which are not subject to the aforementioned disadvantages. Other objects and advantages will appear hereinafter.

According to our invention, we have found that, when $SO_2Cl_2$ is subjected, at certain elevated temperatures, to the action of materials such as cobalt trifluoride ($CoF_3$), silver difluoride ($AgF_2$), or manganese trifluoride ($MnF_3$), or mixtures thereof, these materials function as fluorinating agents and displace chlorine of the $SO_2Cl_2$ with resultant formation of $SO_2ClF$. Further, we find that, at the relatively low elevated temperatures herein stated, the foregoing materials act as fluorinating agents at substantially atmospheric pressures. An outstanding feature of the invention lies in the discovery of $SO_2Cl_2$ fluorinating agents, i. e. those above named, which are of such inherent nature as to permit, in conjunction with reaction temperature control, easy regulation of the degree of $SO_2Cl_2$ fluorination. Moreover, we have found fluorinating agents which are of such characteristics and properties that on exhaustion, the spent fluorinating agents may be readily reconstituted, by simple fluorination by elemental fluorine, to their original active compositions. A distinguishing characteristic of the metal components of the herein fluorinating agents is that the oxides of the metals—namely, cobalt, silver and manganese, catalyze the oxidation of CO to $CO_2$.

Practice of the invention comprises introducing $SO_2Cl_2$ in vapor form into a reaction chamber containing the solid fluorinating agent employed and equipped with means to maintain in the reaction zone the herein specified temperatures, withdrawing the resulting gaseous reaction mixture from the reaction zone, and recovering the sought-for end product from such reaction mixture.

The temperatures at which $SO_2Cl_2$ may be subjected to the action of the chlorine-displacing fluorinating agents of the invention are preferably those sufficiently elevated to effect formation of a substantial amount of $SO_2ClF$. According to the invention, it has been found that control of temperature is a crtical factor in determining the degree of $SO_2Cl_2$ fluorination, and also the yield of $SO_2ClF$ product. In practice of the invention generally, the reaction zone should be maintained at temperatures in the range of 110° C. to 220° C. We find that at temperatures below about 100° to 110° C. no significant yield of $SO_2ClF$ is obtained. The $SO_2ClF$ manufacture objective of the invention arises out of the discovery that under suitable reaction zone temperature regulation, $SO_2Cl_2$ may be fluorinated for the most part to $SO_2ClF$ as distinguished from $SO_2F_2$. Acceptable partial fluorination of $SO_2Cl_2$ and reasonable yields of $SO_2ClF$ may be obtained by permitting reaction zone temperatures to run as high as 220° C. However, realization of the best advantages of the invention with respect to $SO_2ClF$ yield results from our discovery that, to this end, partial fluorination of $SO_2Cl_2$ and optimum yields of $SO_2ClF$ are obtained when maximum temperatures in the reaction zone are maintained in the range of 145° to 170° C.

While not limited to operation at atmospheric pressure, since $SO_2ClF$ may be obtained by use of reduced or superatmospheric pressures, an outstanding advantage of our process is that normal atmospheric pressure may be employed as previously mentioned.

Contacting of $SO_2Cl_2$ reactant and fluorinating agent may be effected in any suitable manner. For example, when using a single reactor, the reaction zone therein containing the fluorinating agent may be maintained at the desired reaction temperature as by adequate external heating. $SO_2Cl_2$ vapor may be continuously introduced into and flowed thru the zone at a rate satisfactory for effecting the desired reaction to form the $SO_2ClF$ reaction product which may be continuously withdrawn from the reactor. Flow of feed material over the fluorinating agent may be intermittent depending upon the particular conditions to which it is desired to adapt the process. When the fluorinating properties of the fluorinating agent become exhausted, the stream of SO₂Cl₂ may be stopped to permit regeneration of the metallic fluoride as hereinafter described. For continuous operation with one reactor, a countercurrent flow of substantially completely fluorinated metallic fluoride thru the reactor may be utilized with provision for continuous removal and refluorination of the agent. Further, for continuous operation it may be desirable to use two or three reactors arranged in parallel. While reactive metallic fluoride is being utilized in one reactor, the exhausted agent in another reactor may be undergoing refluorination. Since a substantial amount of time may be required to purge a reactor with nitrogen at the start of a cycle to remove fluorine and to sweep out the products at the end of the cycle, it may be advantageous to utilize a third reactor in the system.

The reaction of SO₂Cl₂ with the fluorinating agent according to our invention is exothermic. In order to remove more effectively the heat generated by this reaction and thereby facilitate control of temperature in the reaction zone, we prefer to mix inert diluent gas such as nitrogen with vapors of SO₂Cl₂ introduced into the reaction zone. Such diluent gas also aids in the removal of unreacted SO₂Cl₂ from the cooler portions of the reactor exit pipe. The amount of diluent gas employed may be sufficient to provide for smooth temperature control and removal of all vapors from the reactor without unduly complicating the separation of reaction product from the inert gas.

There is no critical maximum time of contact of SO₂Cl₂ reactant with chlorine-displacing fluorinating agent, above which appreciable side reactions occur or other adverse effects are obtained. At long contact times, however, the capacity of the reactor is low, and an economic disadvantage inheres in the operation. On the other hand, if time of contact is too short the reaction of SO₂Cl₂ to produce the desired product may be incomplete. This results in the appearance of relatively small amounts of SO₂ClF and relatively large amounts of unreacted SO₂Cl₂ in the reaction product. Such unreacted SO₂Cl₂ may be recovered from the reaction product and returned to the reaction, but in such operation cost of recovering and recycling unreacted SO₂Cl₂ may amount to an appreciable item. Accordingly, the time of contact employed is determined by balancing the economic advantage of high reactor capacity obtained at short contact times against cost of recovery of unreacted SO₂Cl₂. Further, flow of gaseous reactants thru the reaction zone is dependent upon variables, such as scale of the operation, quantity of fluorinating agent in the reactor, and specific apparatus employed, and optimum rate of flow for any given conditions may be determined by a test run.

While we do not intend to limit our invention to any theory or mechanism of reaction, we believe that SO₂Cl₂ reacts with our chlorine-displacing fluorinating agents according to the following chemical equations:

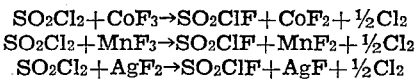

It appears that the fluorine of the fluorinating agent displaces chlorine in SO₂Cl₂ to produce SO₂ClF. Free chlorine is obtained as a by-product.

As heretofore indicated, it is an advantage of our process that the chlorine-displacing fluorinating agent may be regenerated, i. e., restored to its original form and reused in subsequent operations. The metal fluoride, reduced to a fluoride of lower valence by its reaction with the SO₂Cl₂ as heretofore shown, is restored to its form of higher valency by merely bringing the reduced fluoride into contact with gaseous fluorine at suitable temperature. This regeneration of spent fluorinating agent may be suitably carried out in situ in the reaction zone. Gaseous fluorine is passed over the spent catalyst at a temperature suitable for the regeneration of catalyst, e. g. 250° C., and the flow of fluorine continued until the desired degree of regeneration has been obtained. Fluorine is then swept from the reactor, the temperature readjusted and introduction of SO₂Cl₂ resumed.

The product mixture from the reactor, containing SO₂ClF (B. F. plus 7.1° C.); Cl₂ (B. P. minus 34.6° C.); unreacted SO₂Cl₂ (B. P. plus 69.1° C.); and some SO₂F₂ (B. P. minus 55° C.) may be condensed and the components separated by low temperature distillation and fractionation. Sought-for SO₂ClF of relatively high purity may be obtained by this procedure.

The reactor, which may suitably be in the form of a cylindrical tube, is constructed of material resistant to the corrosive attack of gaseous chlorine and fluorine, such as steel. In order to facilitate exposure of solid chlorine-displacing fluorinating agent to SO₂Cl₂ vapors we prefer to stir or otherwise mechanically agitate the bed of solid material in the reaction zone. Suitable means for agitating the catalyst bed may be inserted into the tube at its ends. Inlet and outlet pipe connections, through which feed material is introduced into, and product withdrawn from the reactor, respectively, are supplied at opposite ends of the reactor tube.

The following examples are illustrative of our invention, the parts being by weight:

*Example 1.*—A steel reactor, consisting of a horizontal tube 24 inches long and 2½ inches I. D. and having inlet and outlet connections at opposite ends, was equipped internally with a ½" shaft supported at either end by suitable bearings and associated packing glands, and carrying paddle blades. Means for heating the unit externally with gas were supplied and five thermocouples were placed 4 inches apart along the bottom of the reactor. The reactor was charged with 600 parts of CoF₃ and the temperature adjusted so that reaction zone temperature at the gas inlet was about 110°–120° C., at the center 150°–160° C. and at the exit end about 130°–140° C. A slow stream of nitrogen gas was bubbled through a flask of SO₂Cl₂ heated just below the boiling point, and the SO₂Cl₂–N₂ mixture was then introduced into the reactor through the inlet connection. In this manner, while rotating the shaft and thereby stirring the bed of CoF₃, 398 parts of SO₂Cl₂ were passed into the reactor in 2 hours and 10 minutes. Nitrogen was passed through the reactor for an additional 10 minutes and the reaction products, which had been collected in a trap cooled in dry-ice-acetone mixture, were subjected to fractional distillation. 232 parts of SO₂ClF, 72.5 parts of unreacted SO₂Cl₂, 84.5 parts of free Cl₂ and 13.0 parts of SO₂F₂ were obtained. The yield of SO₂ClF based on SO₂Cl₂ not recovered was 81.5%.

The temperature of the reactor was then raised to approximately 250° C. and a stream of fluorine gas was passed over the bed while agitating the bed. The shaft bearings were protected from contact with fluorine by suitable streams of nitrogen gas. This treatment was continued for 2 hours after which the introduction of fluorine into the reactor was discontinued and the reactor purged of fluorine by continuing to pass a stream of nitrogen therethrough. Thereafter, the fluorinating agent thus regenerated was employed for further conversion of $SO_2Cl_2$ to $SO_2ClF$.

*Example 2.*—Using the procedure and apparatus described in Example 1, 399 parts of $SO_2Cl_2$ were passed thru the reactor in 50 minutes, during which time the temperature of the reactor in the hottest zone was 170–195° C. The reaction zone exit, after liquefaction, was distilled and there was obtained 120 parts of $SO_2ClF$, some $SO_2F_2$, $Cl_2$ and about 117 parts unreacted $SO_2Cl_2$. The yield of $SO_2ClF$ based on $SO_2Cl_2$ not recovered was 49%.

*Example 3.*—Using the apparatus and general procedure of Example 1, 365 parts of $SO_2Cl_2$ were passed in 2⅓ hours thru the steel tube into which 550 parts of $AgF_2$ had been introduced. During this time the temperature in the reactor was maintained at about 147–152° C. On distillation of the mixture caught in the dry-ice trap, 117.5 parts of $SO_2ClF$ and 131 parts of $SO_2Cl_2$ were recovered, representing an $SO_2ClF$ yield of 57% based on $SO_2Cl_2$ not recovered.

*Example 4.*—In another operation similar to those of the above examples, the reactor was charged with about 500 parts of $MnF_3$. $SO_2Cl_2$ was flowed through the reaction zone, maintained at temperature of 159–162° C., for 2 hours and 40 minutes. On distillation of the material caught in the dry-ice trap, 107 parts of $SO_2ClF$ were recovered, and yield of the latter was in excess of 40%.

We claim:

1. In the preparation of $SO_2ClF$, the step which comprises subjecting $SO_2Cl_2$ to the action of a fluorinating agent of the group consisting of $CoF_3$, $AgF_2$ and $MnF_3$, at temperature in the range 110° to 220° C. for time sufficient to form an appreciable amount of $SO_2ClF$.

2. The method of preparing $SO_2ClF$ which comprises subjecting $SO_2Cl_2$ to the action of a fluorinating agent of the group consisting of $CoF_3$, $AgF_2$ and $MnF_3$, at temperature in the range 145° to 170° C., for time sufficient to form a reaction mixture containing an appreciable amount of $SO_2ClF$, and recovering $SO_2ClF$ from said reaction mixture.

3. The method of preparing $SO_2ClF$ which comprises subjecting $SO_2Cl_2$ to the action of a fluorinating agent of the group consisting of $CoF_3$, $AgF_2$ and $MnF_3$, at substantially atmospheric pressure and at temperature in the range 110° to 220° C., for time sufficient to form a reaction mixture containing $SO_2ClF$, and recovering $SO_2ClF$ from said reaction mixture.

4. The method of preparing $SO_2ClF$ which comprises introducing vapors of $SO_2Cl_2$ into a zone containing $CoF_3$ and maintained at temperature in the range 110° C. to 220° C. withdrawing from said zone a reaction mixture comprising $SO_2ClF$, and recovering $SO_2ClF$ from said reaction mixture.

5. The method of preparing $SO_2ClF$ which comprises introducing vapors of $SO_2Cl_2$ into a zone containing $MnF_3$ and maintained at temperature in the range 110° to 220° C., withdrawing from said zone a reaction mixture comprising $SO_2ClF$, and recovering $SO_2ClF$ from said reaction mixture.

6. The method of preparing $SO_2ClF$ which comprises introducing vapors of $SO_2Cl_2$ into a zone containing $AgF_2$ and maintained at temperature in the range 110° to 220° C. withdrawing from said zone a reaction mixture comprising $SO_2ClF$, and recovering $SO_2ClF$ from said reaction mixture.

7. The method of preparing $SO_2ClF$ which comprises introducing vapors of $SO_2Cl_2$ into a zone containing $CoF_3$ and maintained at temperature in the range 145° to 170° C., contacting said vapors with said $CoF_3$ for a time sufficient to convert at least part of said $CoF_3$ to $CoF_2$ to form a reaction mixture comprising a substantial amount of $SO_2ClF$, withdrawing said reaction mixture from said zone, and recovering $SO_2ClF$ from said reaction mixture.

8. The method of preparing $SO_2ClF$ which comprises introducing vapors of $SO_2Cl_2$ into a zone containing $CoF_3$ and maintained at substantially atmospheric pressure and at temperature in the range 145° to 170° C., contacting said vapors with said $CoF_3$ in said zone for a time sufficient to form a reaction mixture comprising a substantial amount of $SO_2ClF$, withdrawing said reaction mixture from said zone, and recovering $SO_2ClF$ from said reaction mixture.

HAROLD GILMAN McCANN.
HORACE QUAY TROUT.

REFERENCES CITED

The following references are of record in the file of this patent:

FOREIGN PATENTS

| Number | Country | Date |
|---|---|---|
| 527,713 | Great Britain | Oct. 15, 1940 |

OTHER REFERENCES

Booth et al.; J. Am. Chem. Soc., vol. 58 (1936), pages 63–66.

Ruff et al.; Z. fur Anorg. u Allg. Chem., vol 219 (1934), pages 147–148.